United States Patent
Schaefer et al.

(10) Patent No.: US 7,593,289 B2
(45) Date of Patent: Sep. 22, 2009

(54) REFLECTORS AND REFLECTOR LIGHT AND SOUND SOURCE SYSTEMS

(75) Inventors: Raymond B. Schaefer, Lexington, MA (US); Michael Grapperhaus, Dracut, MA (US); John Gallagher, Goffstown, NH (US)

(73) Assignee: Phoenix Science & Technology, Inc., Chelmsford, MA (US)

( * ) Notice: Subject to any disclaimer, the term of this patent is extended or adjusted under 35 U.S.C. 154(b) by 617 days.

(21) Appl. No.: 11/379,028

(22) Filed: Apr. 17, 2006

(65) Prior Publication Data

US 2007/0242372 A1   Oct. 18, 2007

(51) Int. Cl.
  *G02B 5/08* (2006.01)
(52) U.S. Cl. ........................................ 367/138
(58) Field of Classification Search ............... 367/138, 367/151, 128, 147; 359/838; 362/296, 297
See application file for complete search history.

(56) References Cited

U.S. PATENT DOCUMENTS

| | | | |
|---|---|---|---|
| 3,613,027 A | 10/1971 | Westermeier | |
| 4,665,405 A | 5/1987 | Drabowitch et al. | |
| 4,777,399 A | 10/1988 | Miyazaki et al. | |
| 5,037,191 A | 8/1991 | Cheng | |
| 5,200,669 A | 4/1993 | Dixon et al. | |
| 5,235,470 A | 8/1993 | Cheng | |
| 5,531,857 A | 7/1996 | Engelsberg et al. | |
| 5,568,967 A | 10/1996 | Sikkens et al. | |
| 5,841,737 A | 11/1998 | Schaefer | |
| 5,900,211 A | 5/1999 | Dunn et al. | |
| 5,945,790 A | 8/1999 | Schaefer | |
| 6,013,918 A | 1/2000 | Bushnell et al. | |
| 6,054,097 A | 4/2000 | Mass et al. | |
| 6,229,272 B1 | 5/2001 | Root | |
| 6,672,729 B1 | 1/2004 | Schaefer | |
| 6,687,189 B1 | 2/2004 | Schaefer et al. | |
| 6,724,134 B1 | 4/2004 | Schaefer | |
| 2005/0259247 A1* | 11/2005 | Cyr et al. ............... 356/239.1 |
| 2007/0242372 A1* | 10/2007 | Schaefer et al. ........... 359/838 |

\* cited by examiner

*Primary Examiner*—Dan Pihulic
(74) *Attorney, Agent, or Firm*—Hamilton, Brook, Smith & Reynolds, P.C.

(57) ABSTRACT

A reflector employs materials and design features that can transfer both light and sound emission simultaneously, from sources to planes or volumes, in an efficient and controlled manner. Compound orthogonal parabolic reflectors employ an extension onto conventional orthogonal parabolic reflectors to efficiently deliver light and/or sound to a focal volume or surface. The extension shapes the output, and can provide inflow and outflow to the focal region, along with a brush. Pulsed sources may be employed, which may emit light, sound or both light and sound, may erode and may be wire initiated with the wire replaced after each pulse by a wire feed.

34 Claims, 11 Drawing Sheets

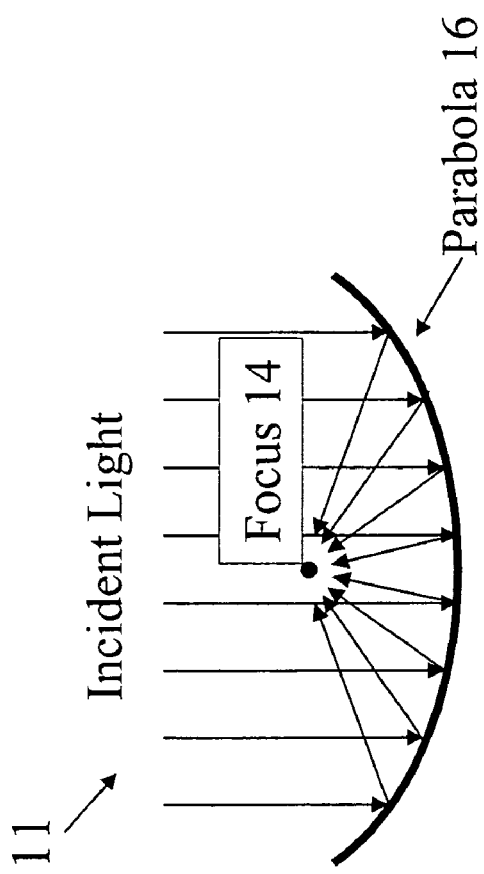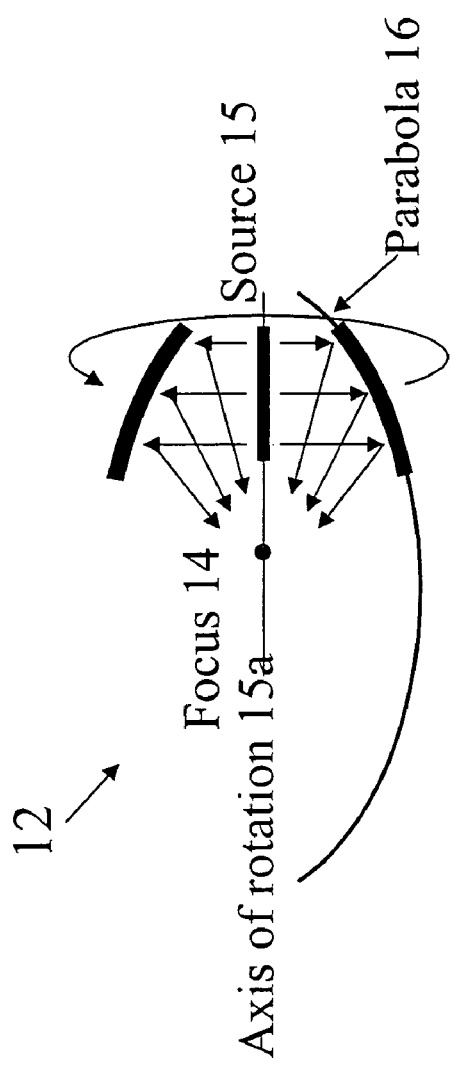

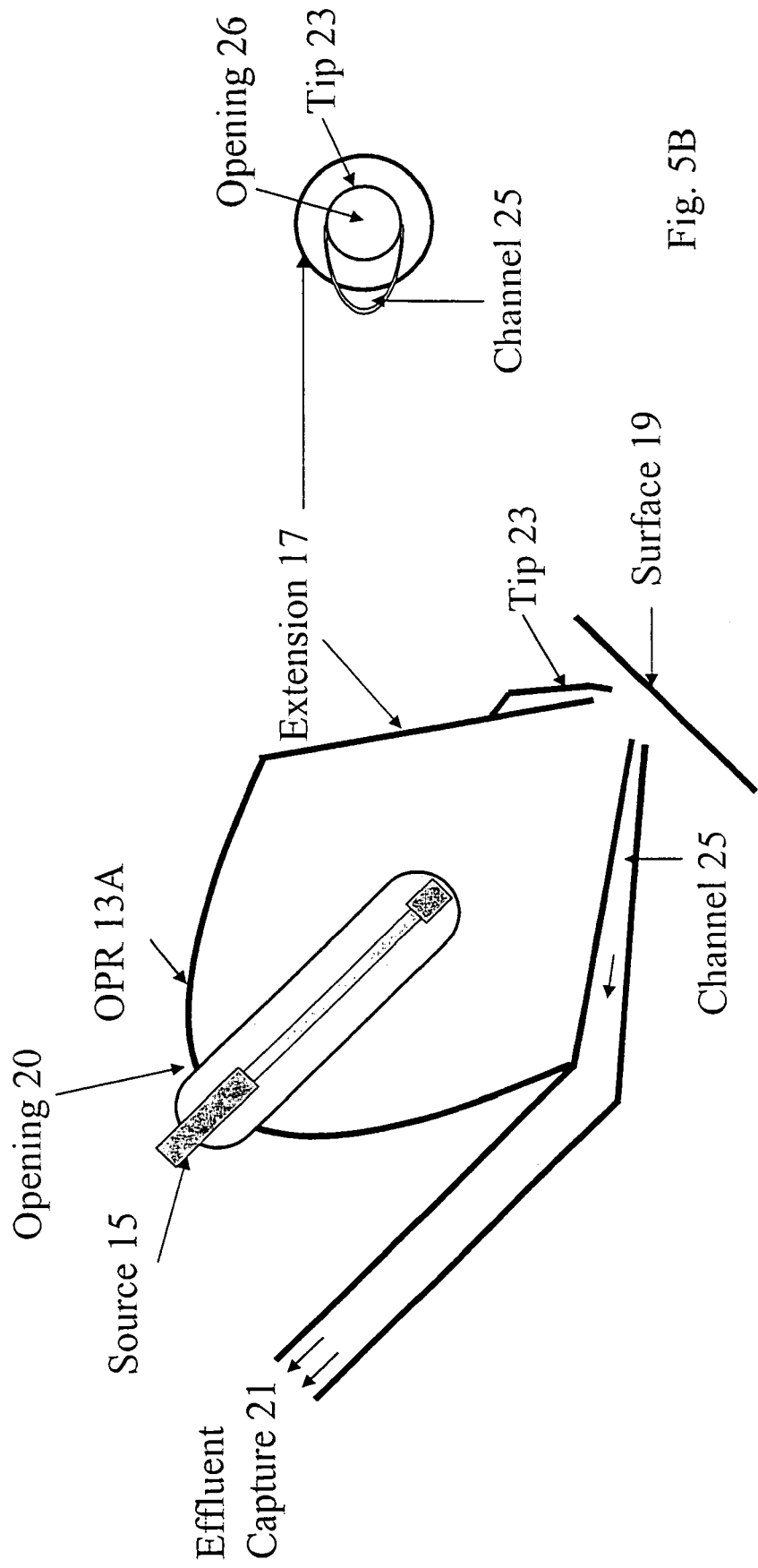

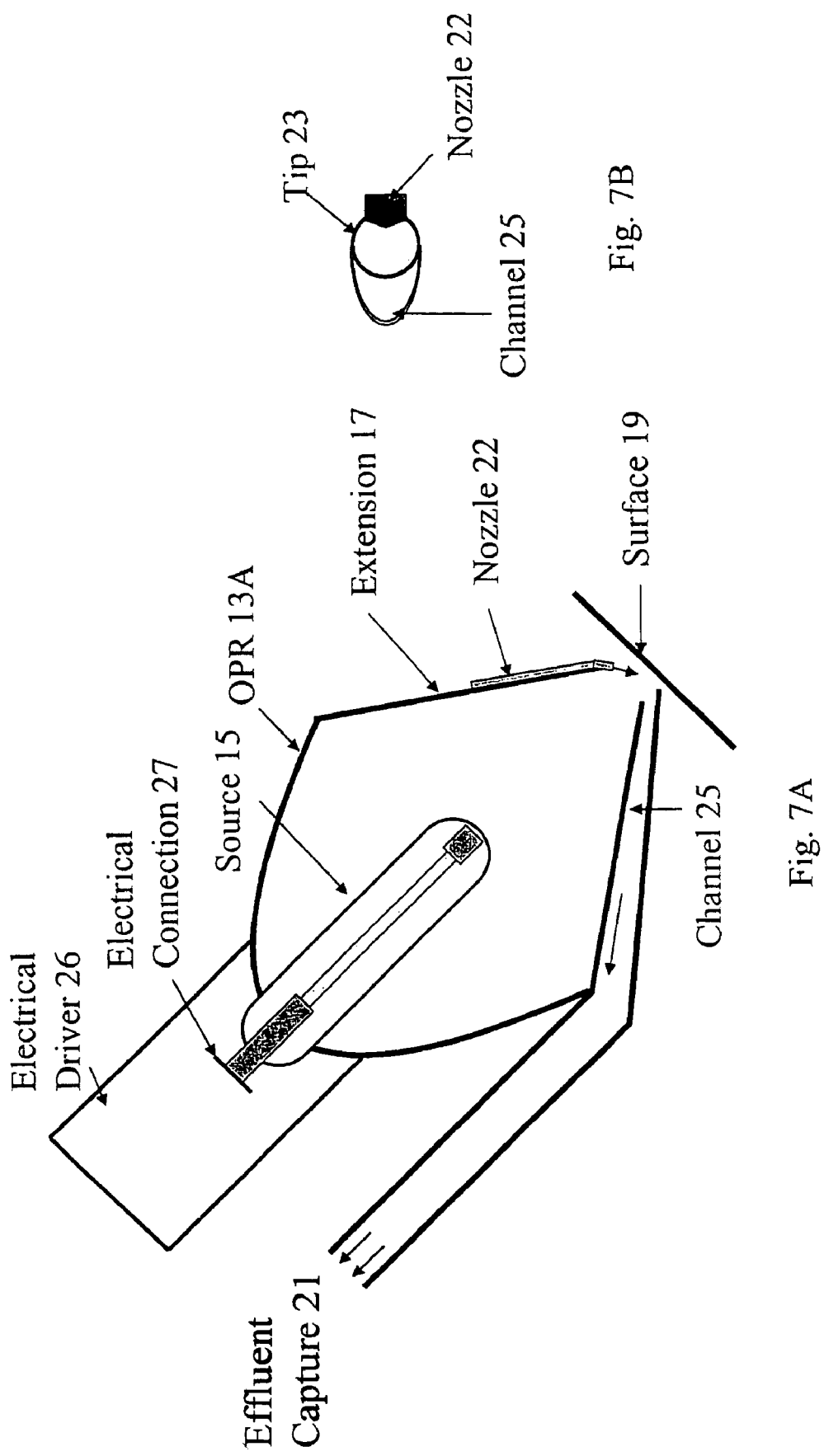

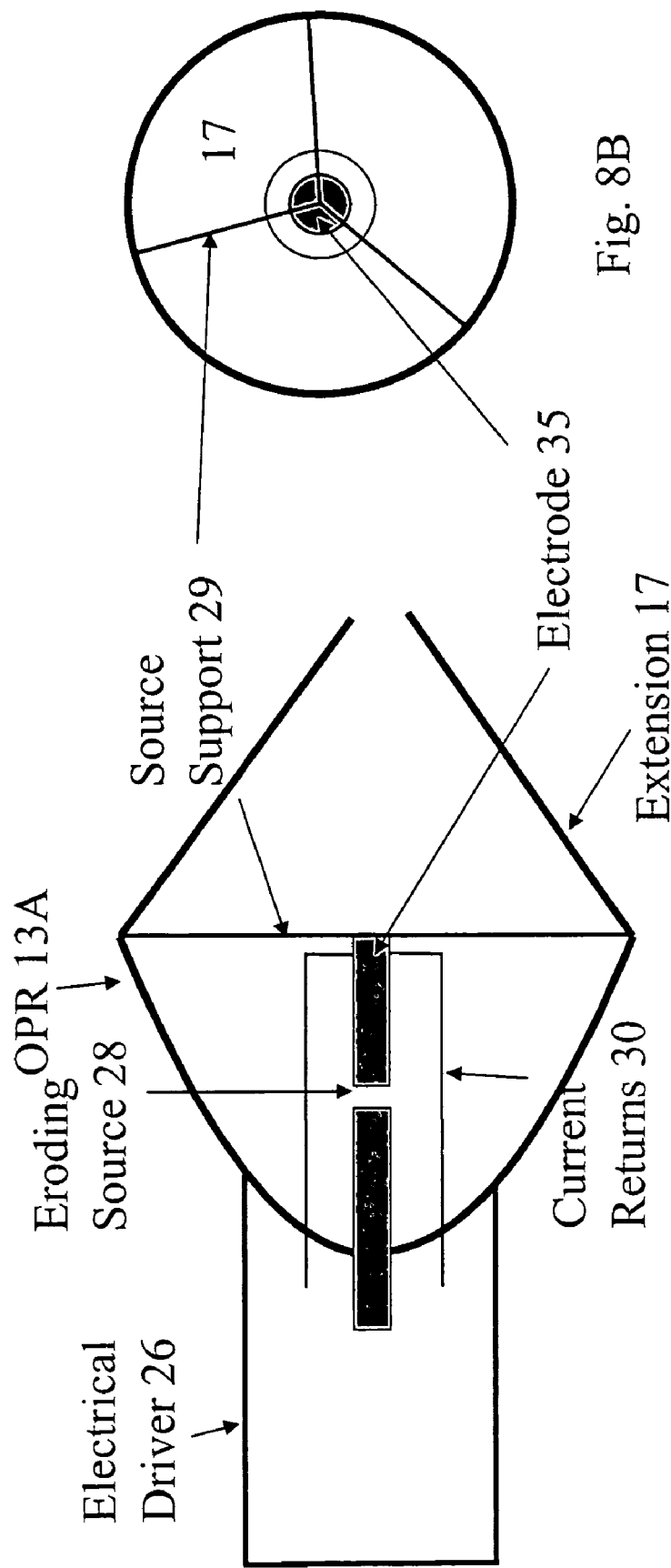

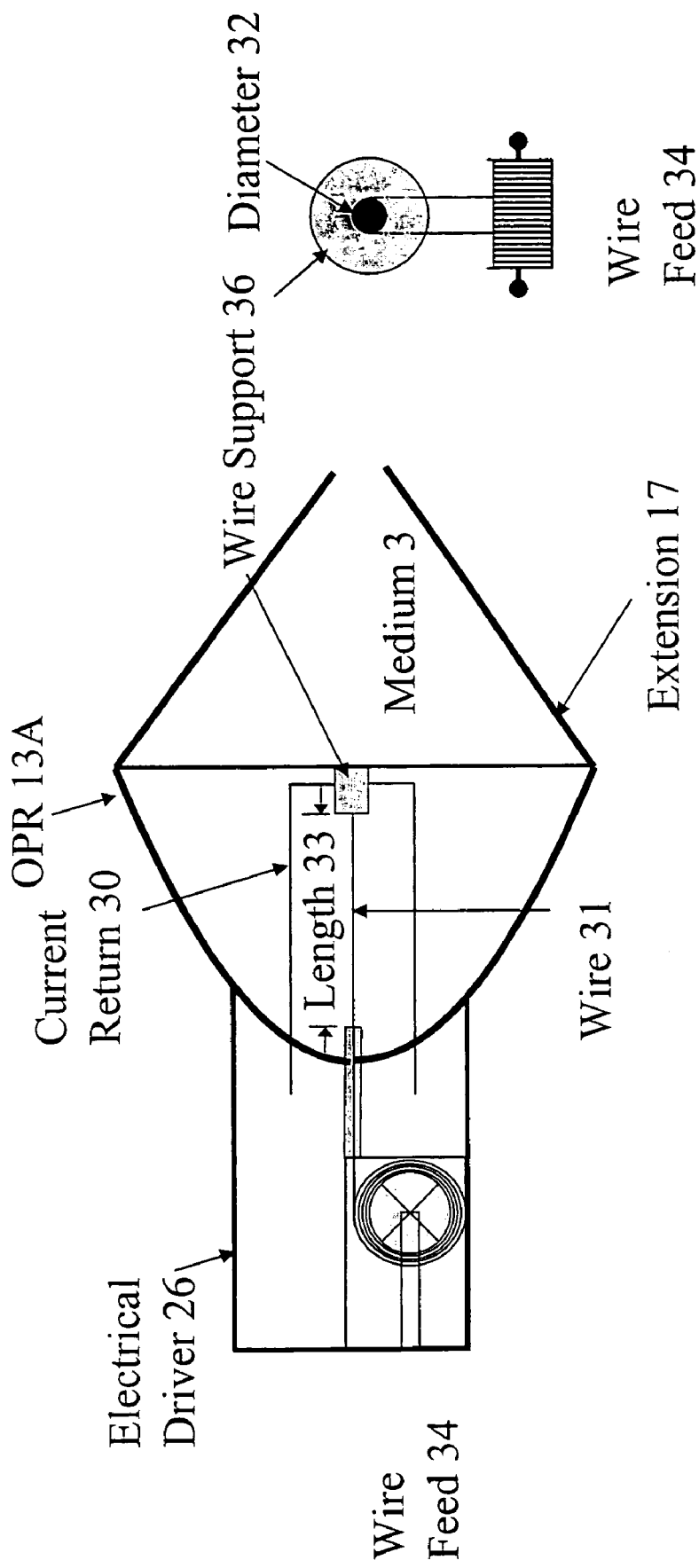

REFLECTORS AND REFLECTOR LIGHT AND SOUND SOURCE SYSTEMS

GOVERNMENT SUPPORT

The invention was supported in part in an Advanced Technology Program under National Institute of Standards and Technology (NIST) Cooperative Agreement No. 70NANB1H3053, and Housing and Urban Development (HUD) Instrument No. MALTS0090-02. The Government has certain rights in the invention.

BACKGROUND

A variety of emission reflectors and reflector/sources are known in the art. For example, fluorescent bulbs have reflectors for illumination that are common in the home. Headlamps of automobiles have parabolic and other shaped reflectors for directing light. Elliptical troughs are used to reimage flashlamps to produce high intensity light for treating surfaces. Parabolic reflectors are used underwater to direct sound from sparker sources into pipes to control zebra mussels. Reflectors known in the art operate efficiently with either light or sound sources. For some applications it would be beneficial for reflectors to operate efficiently with light and sound sources, or sources that emit both light and sound.

Many commercial lamp systems use standard reflectors to deliver light. For example, to treat surfaces, a flashlamp is placed at one focus of an elliptical trough and the surface at the other focus. Because of practical limitations on implementing such reflectors, light source reflector combinations are unable to treat some surface areas, such as into corners, where adjacent walls meet with each other, the ceiling or floors, moldings, stairs, surfaces near any protrusions from the surface or other surface areas difficult to access. This is a disadvantage for paint stripping, for instance, because not all surfaces can be stripped of paint, so that a second technique is needed to complete removal. Most known practical implementations result in a light footprint on the work surface that is well inside the projected footprint of the reflector onto the work surface. In typical applications, light from the reflector cannot strip paint from about 10% of the surface area. In such applications it would be beneficial to have a reflector that allows all surfaces to be stripped of paint or otherwise irradiated by light or sound.

Impulsive and many other acoustic sources are omni-directional. However, in some uses sound output is used only in specific directions. A reflector that can reach surfaces outside the projected footprint of the reflector and that can direct light or sound source output in specific directions is disclosed in U.S. Pat. No. 6,672,729, incorporated herein by reference in its entirety.

Orthogonal parabolic reflectors (OPRs) allow light or sound from a linear or cylindrical source to be focused into a small volume. Many orthogonal reflectors known in the art specify that such reflectors focus the light into a small volume approximating a point. However, for incoherent sources the output is spread over a large volume, with a large fraction lost and not reaching a small volume near the focal point. In some cases in which reflectors known-in-the-art are used with light or sound sources that employ electrodes, erosion during operation causes the source that is initially at a focus of a reflector, to erode away from the focus, and thereby diminish its effectiveness. In those cases it would be advantageous to have a reflector that maintained effectiveness even as the source erodes.

SUMMARY

The present invention relates to reflectors and reflector/source combinations to direct and/or project light and sound emission.

There is a need for an additional reflector capability to capture output that would otherwise be lost, and redirect it to a small volume near focus. There is also a need for a capability to shape the output in the vicinity of the focus to adapt to various applications such as irradiating surfaces with specific shapes. There is also a need for reflectors that can maintain the effectiveness of sound and/or light sources even as electrodes erode.

The efficacy of light or sound sources, as well as combined light and sound sources, depends in part on how the emission from the source is transferred for the intended use. In many applications a reflector is used to direct emitted light and/or sound onto surfaces or into volumes for processing. Embodiments of the present inventive reflectors can be used to improve the useful output or the efficiency of utilizing a source emission. The inventive improvement increases the capability of the source and/or reduces the requirements on the emissive source to accomplish an intended objective.

One aspect of the present invention provides a reflector that efficiently delivers both light and sound. Another aspect of the present invention is directed to a compound orthogonal parabolic reflector (COPR) that is configured to deliver light and/or sound to small focal volumes or surfaces. Other aspects of the present invention may incorporate eroding sources, pulsed power sources and wire initiated sources, implemented into reflectors in such a way as to maintain the position of the focal volume.

Accordingly, a reflector system comprises a source of light and sound emissions and a shaped reflector element for directing and projecting the light and sound emissions to a work surface or into a volume. The reflector element has a material composition and thickness selected for high acoustic reflectivity for wavelengths below a specified maximum. The reflector element includes a shaped reflective surface with a coating having high optical reflectivity.

According to another aspect, a reflector system comprises a source of emissions and a reflector for directing and projecting the emissions toward a work surface or to a focal volume. The reflector comprises an orthogonal parabolic reflector (OPR) element having a focus, the extent of the OPR element terminated at one end before the focus, with the source located along an axis defined such that emissions perpendicular to the axis are transferred to the focus, and a shaped reflector extension in a region between the end of the OPR element and the focus.

In an aspect of the present invention, features of the reflector are such as to efficiently and compactly deliver both light and sound for specific applications. The reflector may be constructed from selected materials with one or more selected coatings applied to the surface, and featuring appropriate thickness and/or dimensions and/or layers so that both light and sound may be effectively utilized for specific applications.

In another aspect of the present invention, a compound orthogonal parabolic reflector (COPR) provides additional reflector elements in conjunction with an orthogonal parabolic reflector element. These additional reflector elements are defined to provide improved delivery of light and/or sound to a focal volume or surface. In OPRs known in the art that employ incoherent sources, a significant portion of the source emission is lost through an opening or otherwise not delivered to the focal region. In some embodiments of the present invention, an additional reflector element may serve to enclose emission that would otherwise be lost and to increase the emission that is delivered to small volumes near the focus and/or surfaces located at or in the vicinity of the focus. Furthermore, for some implementations it may be desirable to shape the emission, for instance, to irradiate a shaped surface. An additional feature or type of element serves to define the shape of the emission from the COPR delivered to small volumes near the focus and/or surfaces located at or in the vicinity of the focus.

In some embodiments the COPR may include a brush element or other device, rotating or otherwise, that can be moved across surfaces after being irradiated in the small volumes near the focus and/or surfaces located at or in the vicinity of the focus.

Additionally, it may be advantageous to add and/or remove materials associated with processes ongoing in the small volumes near the focus and/or surfaces located at or in the vicinity of the focus. Another feature of the COPR may provide means for defining a passage for the removal of vapors or other materials removed from the surface. Another feature of the COPR may provide means to deliver a flow of air or other gas, or of a liquid, into the volume in the vicinity of the focus or onto surfaces in the vicinity of the focus.

A further embodiment of the COPR orients sources whose emission location changes over time, such as from erosion of electrodes, so that the emission continues to be transmitted efficiently to small volumes near the focus and/or surfaces located at or in the vicinity of the focus.

It is advantageous to have the source positioned in the reflector and supported so that it maintains its position during practical use. Another feature of the COPR may provide means for inserting and attaching the source into the reflector system, while stabilizing the source at the location to prevent damage to the source.

Embodiments of the present invention may also incorporate the use of pulsed lamps, pulsed electrical discharges in the medium within the reflector, and sparkers as light and sound sources with the aforementioned inventive reflectors.

A type of source known in the art employs pulsed power to vaporize a wire to initiate an electrical discharge in the medium surrounding the wire. Wire initiated sources known in the art do not have reflectors, and the wire length, diameter and material are not correlated with efficient output from the source. To address this problem, some embodiments of the present invention may include wire initiated sources within the aforementioned inventive reflectors, with the wire diameter, length and material chosen for optimal light and/or sound emission from the source.

Accordingly, aspects of the present invention provide for efficient control of the utilization of light and sound source emission, simultaneously or separately, including COPRs and the use of incoherent sources, including lamps of all types, sparker sources and wire initiated sources.

Embodiments of the present invention are amenable for use in a wide variety of industrial, commercial, military, academic, and environmental applications such as surface treatment (e.g. paint stripping and UV curing), protection against unfriendly divers, crowd control and other less than lethal applications, sterilization, geophysical exploration, antibiofouling, lithotripsy, underwater surveillance, sonobuoys, shallow water characterization, ballast water control, meat tenderization, mine sweeping, submarine countermeasures, disinfection, destruction of organic compounds, for instance, in industrial waste, groundwater and water supplies, and the like.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 3A, 3B illustrate a parabolic reflector (PR) and an orthogonal parabolic reflector (OPR), respectively.

FIG. 5A is a schematic diagram showing an embodiment of a COPR with added tip and effluent capture. FIG. 5B illustrates a side view of the embodiment of FIG. 5A.

FIG. 7A is a schematic diagram showing an embodiment of a COPR with added effluent capture and nozzle. FIG. 7B illustrates a side view of the embodiment of FIG. 7A.

FIG. 8A is a schematic diagram showing an embodiment of a COPR with support to maintain the position of a source and a current return to complete an electrical circuit that powers the source. FIG. 8B illustrates a side view of the embodiment of FIG. 8A.

FIG. 9A is a schematic diagram of an embodiment of a COPR featuring a wire initiated source within the COPR, with a feed mechanism. FIG. 9B illustrates a side view of the embodiment of FIG. 9A.

DETAILED DESCRIPTION OF THE INVENTION

Figure 1B:
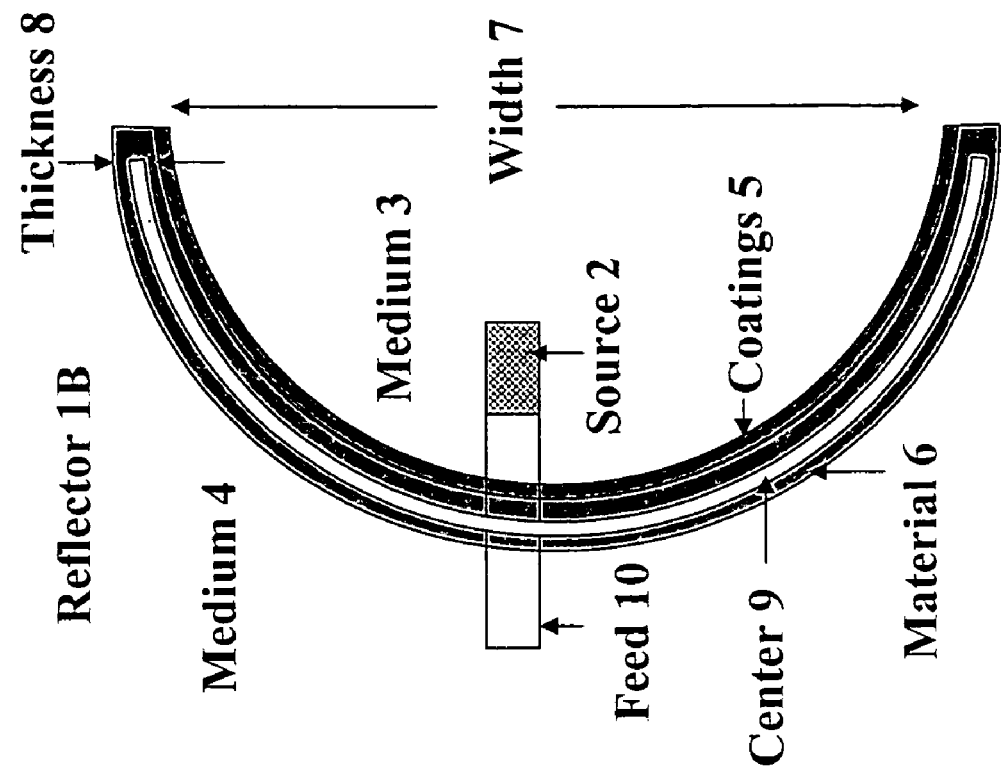
FIGS. 1A, 1B are schematic diagrams of first and second embodiments, respectively, of reflector source systems for use with light, sound or light and sound sources.
Figure 1A:
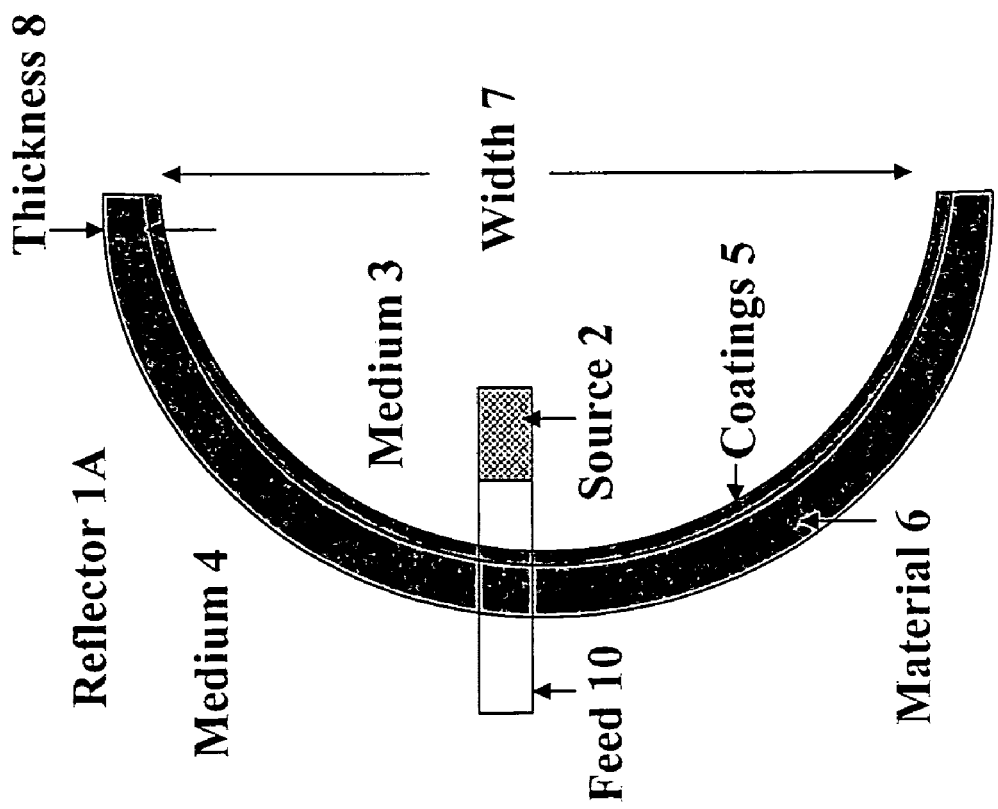

Shown in FIGS. 1A, 1B are embodiments of respective reflector systems 1A, 1B that can be used either with sources 2 that emit both light and sound together, or light or sound separately, and are surrounded by an interior medium 3 on the reflective side and exterior medium 4 on the non-reflective side. The reflector shape can be any of the standard shapes known in the art, or other inventive shapes such as shown in FIG. 2C. The inventive reflector 1A, 1B efficiently reflects and delivers both light and sound emissions from source 2.

So that the reflector 1A, 1B efficiently reflects light, it has any of the standard sets of coatings 5 known in the art, such as an aluminum coating with an overcoating of $SiO_2$, $MgF_2$, or multiple layers of such or other dielectrics, which may be chosen to optimize the reflectivity of a desirable optical spectral region.

So that the reflector 1A (FIG. 1A) also efficiently reflects the desired sound spectrum while in media 3 and 4, the material 6, width 7 and thickness 8 are chosen appropriately. For example, if media 3 and 4 are the same or similar in terms of their acoustic impedance properties, the material 6 is chosen to have a high impedance mismatch with the media. As a further example, many metal materials such as steel have a high impedance mismatch with air or other gaseous media.

For sound frequencies with a corresponding half-wavelength on the order of or larger than the width 7, the sound will diffract and not be well reflected by the reflector. Consequently, the width 7 is chosen to be a large enough size to reflect the longest wavelength desired to have efficient reflection for the particular use.

Furthermore, thickness 8 also is such to produce high reflectivity for the largest desired acoustic wavelength. If the thickness 8 is too small, then for long enough wave-lengths, the reflectivity will be low even with sufficient width 7. To demonstrate the principle of choosing the material 6, width 7 and thickness 8, consider the example of a symmetrical reflector 1A with a surrounding water medium (3 and 4), the reflector of which has high acoustic reflectivity for wavelengths shorter than about sixty inches. This reflector 1A will have a width 7 of about 30 inches. Then, based on knowledge known in the art, a steel material 6 with a thickness of 2 inches has high reflectivity of sixty inch wavelength sound, whereas an aluminum material with a thickness of 2 inches would have low reflectivity. Furthermore, steel with a thickness of 0.5 inches would also have very low reflectivity of sixty inch wavelength sound. Similarly for other combinations of media (3 and 4) and a desired upper limit on acoustic wavelength with high reflectivity, the material 6, width 7 and thickness 8 are chosen using relationships known in the art.

So that the reflector 1B (FIG. 1B) efficiently reflects sound, the center 9 material has a high impedance mismatch with the medium 3, whereas the material 6 can be any thin material. For instance, if the reflector is in water, then the center 9 could be air or other gaseous medium, and the material 6 could be a plastic or other such material with an approximate match in impedance to the medium 3. Similarly, for combinations of media (3 and 4) and a desired upper limit on acoustic wavelength with high reflectivity, the materials 6 and 9, width 7 and thickness 8 are chosen using relationships known in the art.

The theory behind the material and thickness selection is now described. Sound is reflected from an object when its acoustic impedance is not well matched to that of the propagating medium (e.g., air or water). In addition, the frequency of the wave and the thickness of the object also determine the magnitude of the sound reflection, since long wavelengths transmit easily through thin walls. A source such as a sparker is an impulsive source that can generate a broadband spectrum. Acoustic properties differ among different materials and not all materials are suitable for reflectors.

Figure 2A:
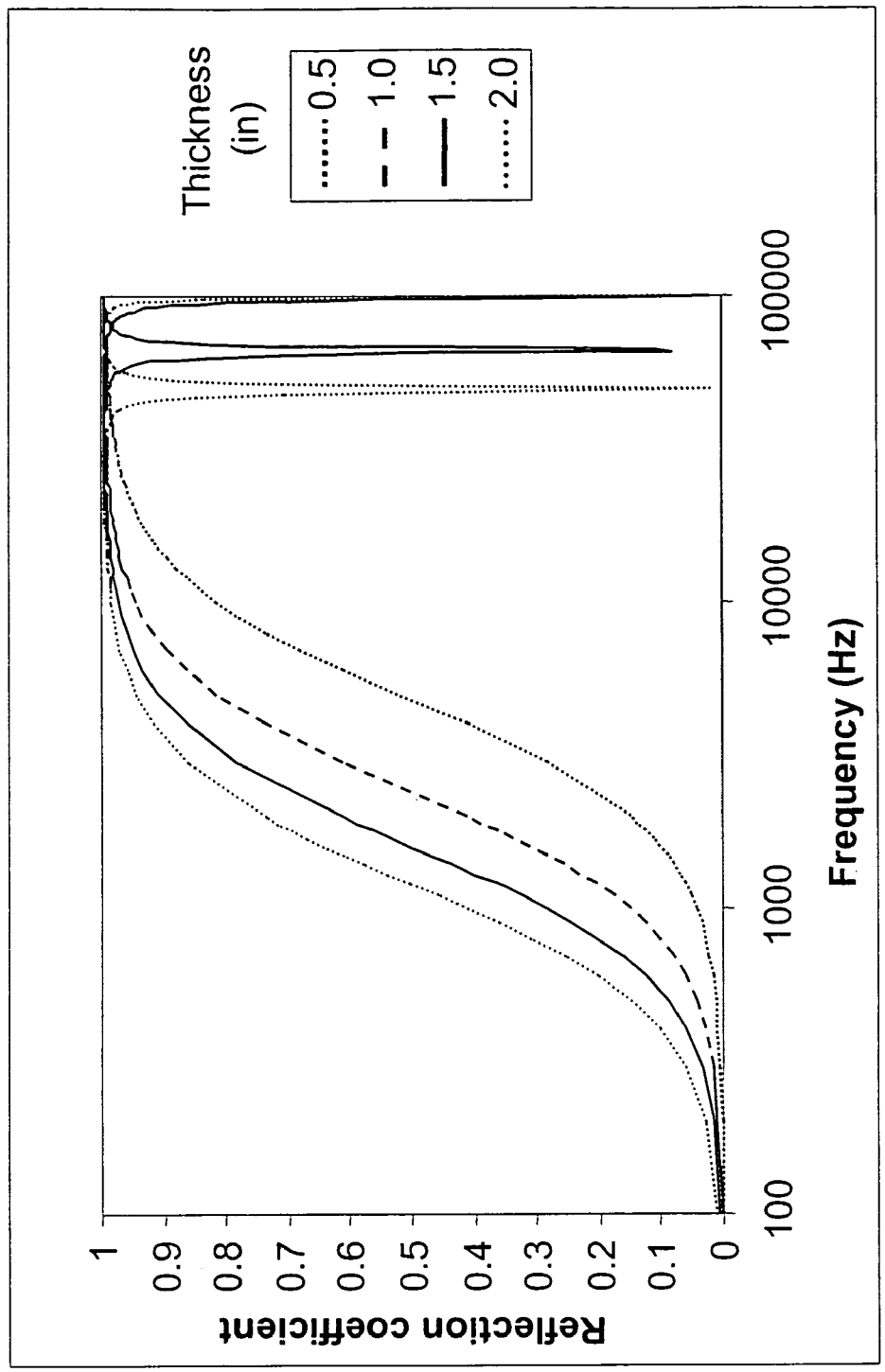
FIG. 2A illustrates a plot of reflection coefficient as a function of frequency for different thicknesses of steel.
Figure 2B:
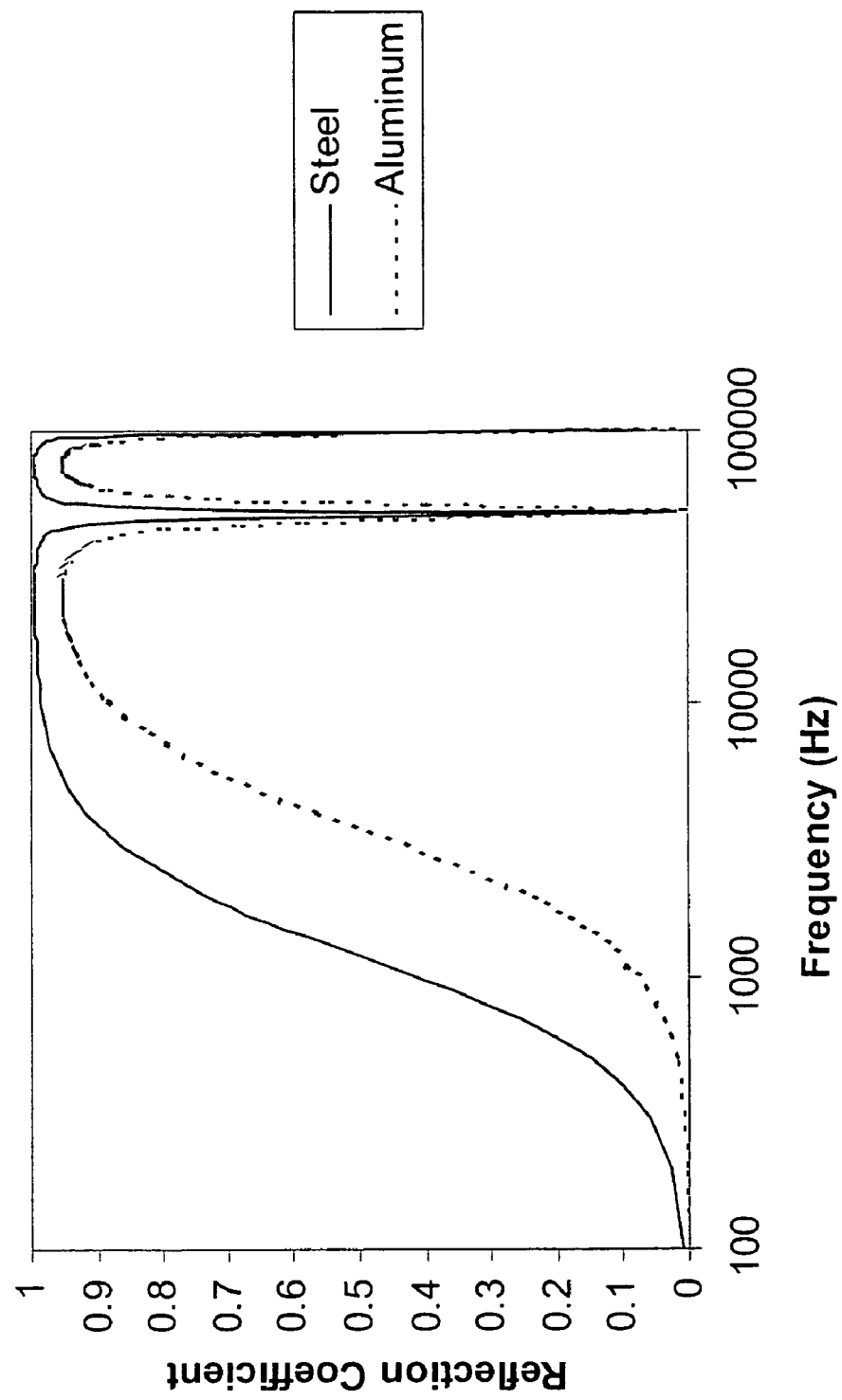
FIG. 2B illustrates a plot of reflection coefficient as a function of frequency for steel versus aluminum.

An example may be understood by selecting hot rolled steel as the material. For a flat plate with wave impinging at normal incidence, and neglecting dissipation, the power reflection coefficient R is given by:

$$R = 1 - \frac{1}{\cos^2 kl + \frac{1}{4}\left(\frac{Z_2}{Z_1} + \frac{Z_1}{Z_2}\right)^2 \sin^2 kl}$$

where l is the thickness of the plate, k is the wavenumber, Z1 is the impedance of the medium and Z2 is the impedance of the plate material. Here it can be seen that the reflection coefficient is low at low frequency (k1 is small) as well as at each half wavelength (k1=nπ). Increasing the thickness is the easiest way to improve reflection, especially at low frequency as seen in FIG. 2A which plots the reflection coefficient as a function of frequency for a steel plate thickness series from 0.5 to 2 inches. The impedance also affects the width of the resonance as seen by comparing aluminum to steel as shown in FIG. 2B. For the best reflection across the widest frequency range, the thickness and acoustic impedance should be as large as possible.

The reflectors 1A, 1B (FIGS. 1A, 1B) also have a feed penetration 10 that may support a source 2, and provide the means to power and control the source. The source 2 may be located at a focus of the reflector 1A, 1B or other position that results in light and/or sound being directed to a useful location. Furthermore, the source 2 may be of a type that emits both light and sound, either simultaneously or sequentially. The source 2 could be a pulsed electric discharge in air or water or other medium 3, which generates both sound and light. The source also could be a pulsed electrical discharge initiated with a wire.

Shown in FIGS. 3A, 3B are diagrams illustrating a parabolic reflector (PR) 11 and an orthogonal parabolic reflector (OPR) 12. The PR 11, a concept known-in-the-art, can collect incoming parallel rays and concentrate them at the focus 14 or, conversely, light rays emitted from the focus 14 are collected and transmitted as outgoing parallel rays. The OPR 12, another concept known-in-the-art, utilizes the principle of the PR. The OPR has a line source 15, placed along the axis of rotation 15a. Rotating a section of the parabola 16 around the source 15 generates a reflector surface that directs light and/or sound emitted from the source 15 to the focus 14 of the parabola 16. The OPR 12 projects output that is perpendicular to the line source 15, to a single focal spot 14. However, many sources 15 have output that is incoherent or in some way is emitted over many directions, so that much of the output is directed away from the focus 14.

Figure 3C:
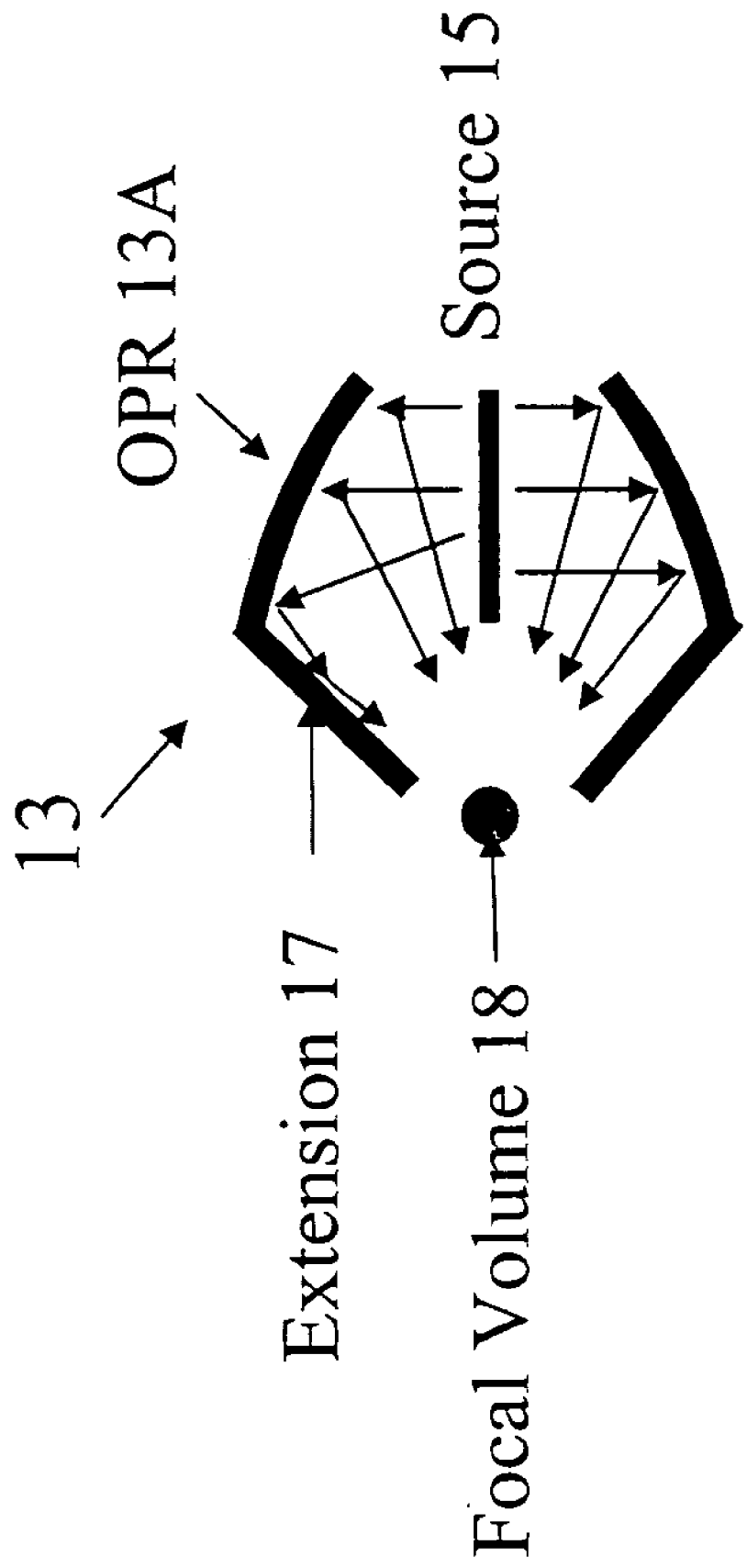
FIG. 3C illustrates a compound orthogonal parabolic reflector (COPR).

FIG. 3C illustrates a compound orthogonal parabolic reflector (COPR) 13. The COPR 13 includes an OPR element 13A and a reflective extension 17. The addition of the extension 17 increases the efficiency of transferring emission to a focal volume 18, a region of high intensity in the vicinity of the focus 14. The extension 17 is shown to be conical, but may be any shape that increases the delivery of output from the source 15 to the focal volume 18.

Figure 4:
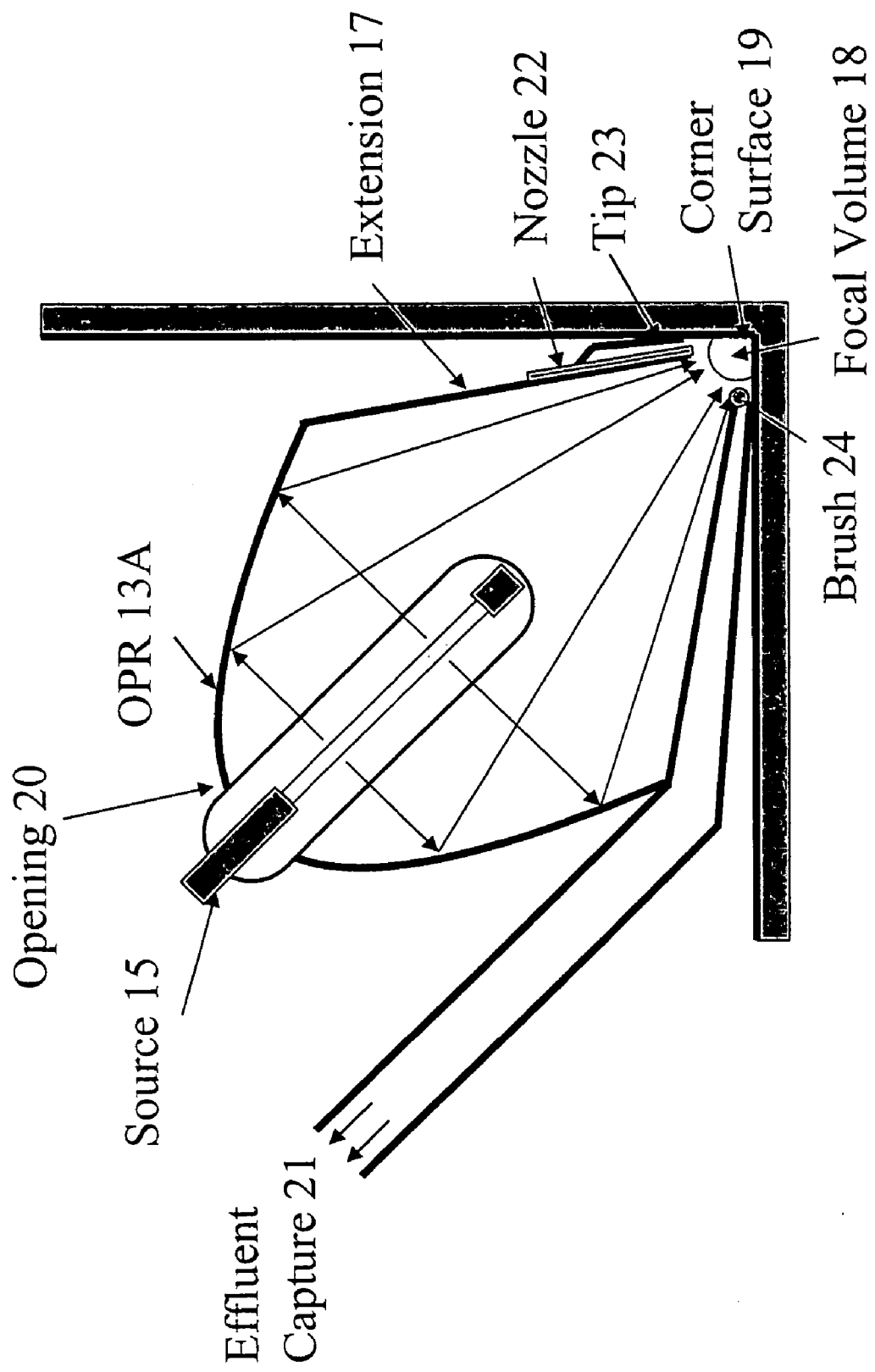
FIG. 4 is a schematic diagram of a COPR with additional features for practical implementation.

Illustrated in FIG. 4 are several additional features afforded by the COPR. For an appropriately shaped extension 17 the focal volume is outside the open end. This enables the focal volume to, for instance, encompass the surface of a corner 19. If the source 15 is a pulsed lamp of a high enough intensity, then this inventive system could be used to prepare, clean, strip paint from, or otherwise affect a surface. Although the embodiment in FIG. 4 shows a corner surface 19, any shaped surface is contemplated by the principles of the present invention. Further, the embodiment in FIG. 4 has an opening 20 for implementing, powering and controlling the source 15. Further, an effluent capture 21 may be attached or otherwise connected to the extension 17 for removing materials, gases, vapors and otherwise associated with delivering output to the focal volume 18 from the source 15.

A nozzle 22 or other means may be attached or otherwise affixed to the extension 17 for delivering a gaseous or liquid material incident on the surface 19 for the purpose of acting synergistically with the output from the source 15 to affect processes at the surface 19. In addition, the nozzle 22 may include a shaped tip 23 to shape the output delivered to the focal volume 18. Further, a brush 24 may be attached to or otherwise affixed to the extension 17 that may come in contact with the surface before and/or after the source 15 output impinges on it, to further participate in affecting the surface or materials removed or added to the surface.

Illustrated in FIGS. 5A, 5B, 6A, 6B, 7A, 7B are further detailed embodiments of practical features of the inventive COPR, including those embodied in FIG. 4. With reference to FIGS. 5A, 5B, a tip 23 is attached to the open end of the extension 17, with a channel 25 defined as part of an effluent capture 21. Although the tip 23 defines a circular shaped opening 26 adjacent to the surface 19, it is understood that all feasible shapes for delivering output to different specific shaped surfaces are contemplated in accordance with principles of the present invention. The effluent capture 21 shown is a simple channel 25 in the embodiment in FIG. 5B, but any means for transferring materials from regions at or near the surface 19 are understood to be included in the invention. Furthermore, the effluent capture 21 may have a pump or other means to provide suction for removing the materials, and may include filters or other means for removing processed materials from the air or other medium that contains any materials associated with the process at the surface.

Figures 6A, 6B:
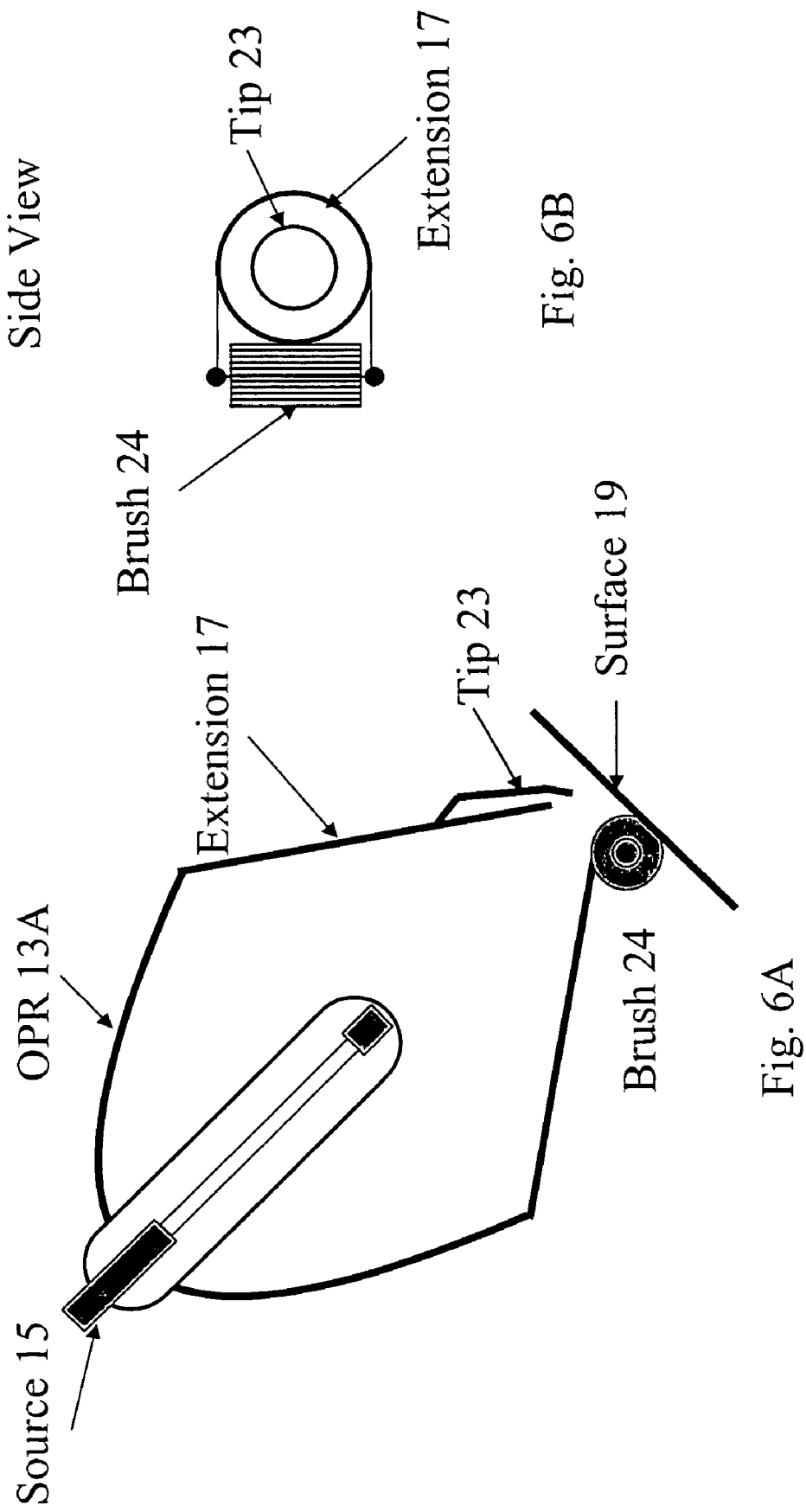
FIG. 6A is a schematic diagram showing an embodiment of a COPR with added tip and brush.
FIG. 6B illustrates a side view of the embodiment of FIG. 6A.

FIGS. 6A, 6B show an additional embodiment of the extension 17 with a tip 23 and brush 24, where the brush 24 is mounted in a way to allow rotation. This provides a way, for instance, to clean the surface 19 before and/or after output from the source 15 is incident on the surface 19. It is understood that other shapes of brushes 24, powered or un-powered are included in the invention.

FIGS. 7A, 7B show an additional embodiment of the extension 17 with an effluent capture 21 and a nozzle 22 oriented to provide inflow toward and along the surface 19 in such a way that the inflow proceeds to the channel 25. Further, the embodiment shows an electrical driver 26 mounted on, or in the vicinity of, the outside of the OPR 12, with means for electrical connection 27 to the source 15. The proximity of the electrical driver 26 to the source 15 provides a low inductance arrangement advantageous for fast risetime and short pulse sources.

Referring now to FIGS. 8A, 8B, another embodiment utilizes a linear eroding source 28 oriented as the source 15, which in this case consists of two electrodes 35 but which in general could consist of any eroding source 28. This configuration provides the means for the output from the source 28 to be transferred to the focal volume 18 even as the emission region changes due to erosion or other source movements along the axis of rotation 15a. This embodiment also provides for a support 29 to fix the source, 15 or 28, in place along the axis 15a. The embodiment shows the support 29 consisting of three linear supports, but may consist of any other number or shapes of supports that may effectively maintain the location of the source, 15 or 28. Further, this embodiment includes conducting elements 30 to provide the means for electrical current to flow back to the electrical driver 26 to complete the circuit.

Referring to FIGS. 9A, 9B, a further embodiment employs a linear source 15 that is initiated by a wire 31. An electrical driver 26 supplies energy to the wire 31 so as to vaporize or explode it, thereby producing a plasma which emits both sound and light. The wire 31 is of a diameter 32 and length 33 to optimize the sound and/or light in the medium 3. Other embodiments of the invention in addition may have a wire feed 34 to supply additional wires 31 for repetitive pulse operation.

While this invention has been particularly shown and described with references to preferred embodiments thereof, it will be understood by those skilled in the art that various changes in form and details may be made therein without departing from the scope of the invention encompassed by the appended claims.

What is claimed is:

1. A reflector system comprising:
    a source of light and sound emissions; and
    a shaped reflector element for directing and projecting the light and sound emissions to a work surface or into a volume, the reflector element having a material composition and thickness selected for high acoustic reflectivity for wavelengths below a specified maximum, the reflector element including a shaped reflective surface with a coating having high optical reflectivity, wherein the reflector element has an emissive opening sized to be one-half the wavelength of a shortest wavelength desired for high acoustic reflectivity.

2. The reflector system of claim 1 wherein the system is used in air or other gaseous media.

3. The reflector system of claim 1 wherein the reflector element further includes a second material composition defining at least one additional reflective surface that produces high acoustic reflectivity.

4. The reflector system of claim 1 wherein the source is located in a region near the reflective surface.

5. The reflector system of claim 1 wherein the reflector element has a feed-through for positioning, powering and controlling the source.

6. The reflector system of claim 1 wherein the reflective surface has an elliptical or parabolic shape.

7. A reflector system comprising:
    a source of light and sound emissions; and
    a shaped reflector element for directing and projecting the light and sound emissions to a work surface or into a volume, the reflector element having a material composition and thickness selected for high acoustic reflectivity for wavelengths below a specified maximum, the reflector element including a shaped reflective surface with a coating having high optical reflectivity, wherein the reflective surface and source are oriented in an orthogonal parabolic configuration.

8. The reflector system of claim 7 wherein the material composition is selected to have high impedance mismatch with media in which the system is used.

9. The reflector system of claim 8 wherein the material composition is a metal material and the system is used in air or other gaseous media.

10. A reflector system comprising:
    a source of emissions; and
    a reflector for directing and projecting the emissions toward a work surface or to a focal volume, the reflector comprising an orthogonal parabolic reflector (OPR) element having a focus, the extent of the OPR element terminated at one end before the focus, with the source located along an axis defined such that emissions perpendicular to the axis are transferred to the focus, and a shaped reflector extension in a region between the end of the OPR element and the focus.

11. The reflector system of claim 10 wherein the reflector extension is shaped and terminated so that the focus is external to the reflector system.

12. The reflector system of claim 11 wherein the reflector is shaped such that the focal point can be at or near the intersection of at least two perpendicular walls.

13. The reflector system of claim 12 wherein the reflector extension is cone shaped.

14. The reflector system of claim 10 wherein the reflector extension further includes a shaped tip.

15. The reflector system of claim 14 wherein the reflector extension with the tip are shaped such that the focal point can be at or near the intersection of at least two perpendicular walls.

16. The reflector systems of claim 10 wherein the reflector further includes a passage adjacent to the reflector extension through which materials can be removed from, or added to, the vicinity of the focus.

17. The reflector system of claim 16 wherein the passage is a channel with one surface defined by the exterior surface of the reflector extension.

18. The reflector system of claim 16 wherein the reflector further includes a nozzle located adjacent to the reflector extension for conducting gaseous or liquid media to the vicinity of the focus or surface(s) in the vicinity of the focus.

19. The reflector system of claim 18 wherein the nozzle is located so that its flow is oriented in the proximate direction of the passage.

20. The reflector system of claim 16 wherein the reflector further includes a brush positioned for contacting a work surface proximate to the focus.

21. The reflector system of claim 20 wherein the brush rotates.

22. The reflector system of claim 20 wherein the brush is positioned to aid in the movement of materials in the vicinity of the focus to or from the passage and/or the nozzle.

23. The reflector system of claim 10 wherein the reflector further includes a nozzle located adjacent to the reflector extension for conducting gaseous or liquid media to the vicinity of the focus or surface(s) in the vicinity of the focus.

24. The reflector system of claim 10 wherein the reflector further includes a brush positioned for contacting a work surface proximate to the focus.

25. The reflector system of claim 10 wherein the OPR element has an opening at its apex.

26. The reflector system of claim 25 wherein the source is positioned through the opening and along the axis.

27. The reflector system of claim 26 wherein the source erodes along the axis.

28. The reflector system of claim 26 wherein the source position is maintained by one or more supports at the end of the source nearest the focus.

29. The reflector system of claim 26 wherein the source is a pulsed source.

30. The reflector system of claim 29 further comprising a pulsed power electrical circuit adjacent to the opening for powering the source.

31. The reflector system of claim 29 wherein the pulsed source is initiated with a wire.

32. The reflector system of claim 31 wherein the wire length and diameter are chosen to optimize the output for a particular electrical circuit.

33. The reflector system of claim 31 further comprising a wire feed that can replenish the wire after initiation.

34. The reflector system of claim 31 further comprising one or more current return wires that complete the circuit.

* * * * *

UNITED STATES PATENT AND TRADEMARK OFFICE
CERTIFICATE OF CORRECTION

PATENT NO. : 7,593,289 B2  Page 1 of 1
APPLICATION NO. : 11/379028
DATED : September 22, 2009
INVENTOR(S) : Schaefer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 775 days.

Signed and Sealed this

Twenty-first Day of September, 2010

David J. Kappos
*Director of the United States Patent and Trademark Office*